(12) United States Patent
Johnson

(10) Patent No.: US 6,467,997 B2
(45) Date of Patent: Oct. 22, 2002

(54) SYSTEM AND METHOD FOR DIVERTING FISH AROUND A STRUCTURE

(75) Inventor: Robert L. Johnson, Pasco, WA (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/771,805

(22) Filed: Jan. 29, 2001

(65) Prior Publication Data

US 2002/0102135 A1 Aug. 1, 2002

(51) Int. Cl.$^7$ ................................................ E02B 8/08
(52) U.S. Cl. ............................ 405/81; 405/83; 210/155; 119/219
(58) Field of Search .............................. 405/62, 81, 82, 405/83, 84, 85, 86; 210/154, 155, 160–163, 170, 499; 119/3, 219, 220

(56) References Cited

U.S. PATENT DOCUMENTS

| | | | |
|---|---|---|---|
| 1,730,005 A | * 10/1929 | Grether | 405/81 |
| 1,798,238 A | * 3/1931 | Wass | 405/81 |
| 2,612,861 A | 10/1952 | Burkey | |
| 2,761,421 A | 9/1956 | Burkey | |
| 2,860,600 A | * 11/1958 | Cheney | 119/219 |
| 2,922,282 A | 1/1960 | Dohrer | |
| 3,802,565 A | * 4/1974 | Hughs et al. | 210/160 |
| 3,938,340 A | * 2/1976 | Downs | 405/83 |
| 4,198,925 A | 4/1980 | Lindbergh | |
| 4,437,431 A | 3/1984 | Koch | |
| 4,447,323 A | * 5/1984 | Jackson | 210/158 |
| 4,481,904 A | 11/1984 | Fletcher | |
| 4,488,835 A | 12/1984 | Eicher | |
| 4,526,494 A | 7/1985 | Eicher | |
| 4,582,601 A | * 4/1986 | Strow et al. | 210/161 |
| 4,676,893 A | * 6/1987 | Travade et al. | 119/3 X |
| 4,743,742 A | 5/1988 | Espedalen | |
| 4,854,455 A | 8/1989 | Faivre | |
| 5,385,428 A | 1/1995 | Taft et al. | |
| 5,632,572 A | 5/1997 | Chicha | |
| 5,730,086 A | 3/1998 | Truebe | |
| 5,816,196 A | 10/1998 | Webster et al. | |
| 6,102,619 A | 8/2000 | Truebe et al. | |
| 6,187,184 B1 | * 2/2001 | Reetz et al. | 405/82 X |

FOREIGN PATENT DOCUMENTS

EP   565793   * 10/1993   ................ 119/219

* cited by examiner

Primary Examiner—Heather Shackleford
Assistant Examiner—Jong-Suk Lee
(74) Attorney, Agent, or Firm—Woodard, Emhardt, Naughton, Moriarty & McNett

(57) ABSTRACT

A fish diversion apparatus for a water intake of a dam includes a frame extending between a top end oriented towards the water surface and a bottom end oriented below the water surface. The frame supports a number of bar screen panels below the water surface. The bar screen panels allow water flow therethrough from an upstream side to a downstream side. A flow scoop extends from the bottom end of the frame to direct the fish along the upstream face of the bar screen panels. A fish diverter device is provided adjacent the top end of the frame in communication with the upstream side of the bar screen panels.

19 Claims, 2 Drawing Sheets

SYSTEM AND METHOD FOR DIVERTING FISH AROUND A STRUCTURE

BACKGROUND OF THE INVENTION

The present invention relates generally to systems for diverting aquatic life over or around structures that inhibit migration of anadromous species along a waterway.

Dams and other structures are placed in waterways to redirect natural water flow for other uses, such as power generation, industrial processes, water supplies, and agricultural development. The redirected water can be employed with various apparatus or systems, such as turbines, pumps, cooling systems, irrigation canals, and water treatment systems, to name a few. The redirected water typically travels through one or more intakes or spillways positioned below or at the water surface. This redirection of water creates a risk that fish and other aquatic life will be injured or killed by the various apparatus in the path of the redirected water, or killed or injured in the eventual use of the redirected water. For example, fish can be entrained into the intake or impinged onto the intake screen protecting a turbine intake that is in the path of the redirected water flow.

The above problems are particularly acute with respect to fish that must migrate to the sea as a critical part of their life history. In addition to other anadromous species, the salmon smolt has had particular attention devoted to preserving its migratory capabilities over or around structures that redirect flow in the waterway. This focus is further magnified when the aquatic species is protected under the Endangered Species Act as is the salmon smolt.

Salmon smolts have a natural instinct to travel down the waterway in which they inhabit to the sea. The natural habitat of a smolt in a non-obstructed flowing waterway is relatively noisy. When a dam is in the waterway, the habitat of the smolt is relatively still and quiet upstream of the dam. However, the environment in the waterway near the dam structure includes many sounds along with rapidly changing accelerating and decelerating flows, which is further exasperated if the dam has hydroelectric machinery such as turbines. This creates a sudden change in the environment from a peaceful one to a very disruptive one. These noises and changing flow patterns are unfamiliar to the smolt that is accustomed to the waterway habitat in which it previously lived. Current attempt to bypass smolts around the dam have met with marginal success perhaps due to the abrupt change in environment near the dam.

Although smolts feel a natural urge to continue downstream toward the sea, the disturbances caused by the dam that is in the waterway create hesitation in the smolt and disrupt migratory behavior. This disruption can result in the loss of salmon population unless adequate paths around the structure are provided for the smolts.

One example of a fish diversion apparatus is provided in U.S. Pat. No. 5,385,428. The '428 patent describes a diversion apparatus 20 that requires floors 30a and 30b, sidewalls 36a and 36b, and roof 72, each of which is constructed of reinforced concrete, structural steel, or steel plate. The apparatus 20 is built into a substrate 70 which may consist of rock, soil, or sand depending on site conditions. One drawback to the apparatus of the '428 patent is that it can be expensive to construct since apparatus 20 requires its construction in the waterway. Apparatus 20 also contributes to further disruption of the waterway habitat since it is permanently located in the waterway upstream of the dam. Another drawback is that the height of apparatus 20 could become large as the depth of the waterway increases, which further increases cost and complexity.

While there have been attempts in the prior art to provide systems that route smolts and other aquatic life around foreign structures in the waterway, there remains room for improvements. There remains a need for a system that takes advantage of smolt behavior near the dam in order to facilitate this diversion. There also remains a need for a system that makes the transition of smolts and other aquatic life around the dam less traumatic and less frightening. The system should be readily adaptable for use with existing structures, and should also be able to be employed with the design of new structures. Furthermore, the system should be relatively inexpensive. The present invention is directed to meeting these needs, among others.

SUMMARY OF THE INVENTION

The present invention is directed to a fish diversion apparatus to divert smolts and other aquatic species around a dam or other waterway structure.

Several characteristics of smolt behavior immediately upstream of existing dams have been noted in consideration of the design of the system of the present invention. One characteristic is that smolt behavior becomes increasingly complex in both horizontal and vertical movement as the dam structure is approached. Another characteristic is that smolts typically face upstream for swimming control while traveling downstream. Smolts also migrate relatively high in the water column as the dam is approached, generally staying within 10 meters or less below the water surface. Further, the speed with which the smolts swim decreases near the dam structure. The present invention considers this behavior in the design of a diversion system to direct smolts around dam structures by creating a substratum to gently guide the smolts to a bypass near the water surface and away from the turbines or other harmful structures of the dam. It is further believed that the system of the present invention may have application in diverting fish around structures other than dams and also application with aquatic species other than salmon smolts.

According to one aspect of the present invention, there is provided a fish diversion apparatus that diverts fish and other aquatic species around a structure in the waterway. The apparatus includes a frame extending between a top end that is oriented towards the water surface and a bottom end that is oriented below the water surface. The frame supports a number of bar screen panels below the water surface. The bar screen panels allow water to flow through the panels from an upstream side to a downstream side of the bar screen panels. A flow scoop extends from the bottom end of the frame to divert the fish upwardly along the upstream face of the bar screen panels. The flow scoop also discourages the fish from moving down the screen and below the frame. The fish are captured in a fish diverter device that is provided adjacent the top end of the frame in communication with the upstream side of the bar screen panels.

According to another aspect of the invention, a fish diversion system is provided to divert fish around a structure that extends below the surface of a body of water. The system includes a frame that extends between a top end oriented towards the water surface and a bottom end oriented below the water surface. The frame supports a number of bar screen panels below the water surface. The bar screen panels allow water to flow therethrough. At the top end of the frame, a fish diverter device is provided that is in communication with the upstream side of the bar screen panels. The fish diverter device includes an incline panel pivotally attached at one end to an upper end of the frame and/or the bar screen panels. An entry portion to a collection channel is pivotally attached at the other end of the incline panel.

Another aspect of the invention provides a method for diverting fish around a structure in a waterway. The fish and water flow are directed by a flow scoop upwardly along the upstream face of a number of bar screen panels and into a collection device.

These and other aspects, forms, embodiments, features, objects and advantages of the present invention will be apparent in the detailed description that follows.

DESCRIPTION OF THE PREFERRED EMBODIMENT

Figure 1:
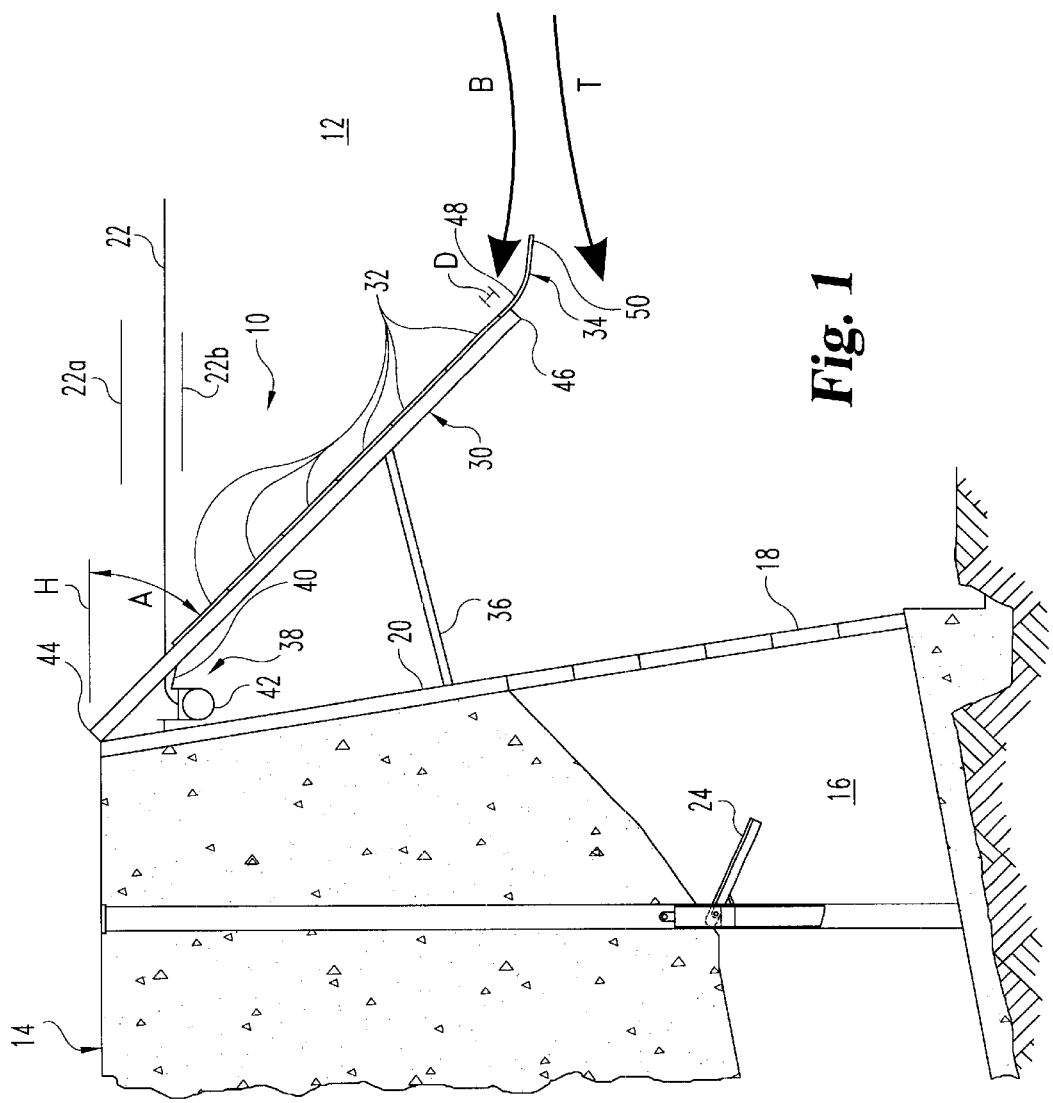
FIG. 1 is side elevational view of the fish diversion system of the present invention alongside a dam.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any such alterations and further modifications in the illustrated device, and any such further applications of the principles of the invention as illustrated therein are contemplated as would normally occur to one skilled in the art to which the invention relates.

Referring now to FIG. 1, there is illustrated a fish diversion system 10 adjacent to a dam 14. Dam 14 is used to form a body of water or a waterway 12 behind an upstream face 20 of dam 14. Waterway 12 has a water surface 22, which varies between a maximum pool elevation 22a and minimum pool elevation 22b. In the illustrated embodiment, water surface 22 is at about the normal pool elevation. As understood by those skilled in the art, dam 14 can include an intake 16 for a turbine or the like and a trash rack screen 18 positioned along the upstream side of intake 16. A fixed or traveling screen 24 can be positioned upstream of the turbine within the intake. Furthermore, although reference is made herein to dam 14, it is to be understood that other types of structures in waterway 12 are also contemplated.

Figure 2:
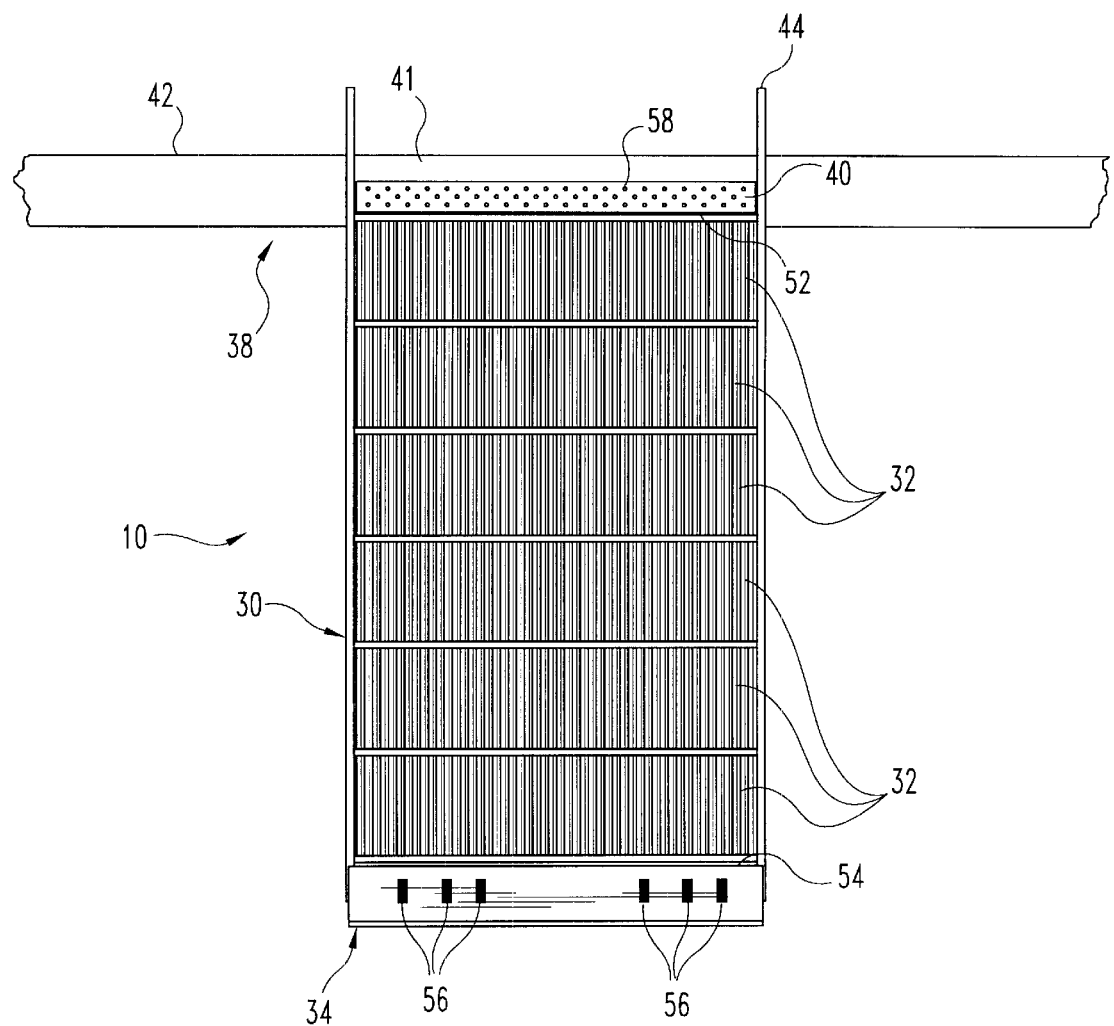
FIG. 2 is a front elevational view of the fish diversion system of FIG. 1.

Referring now also to FIG. 2, system 10 includes a frame 30 that supports a number of bar screen panels 32 thereon. It is contemplated that bar screen panels 32 are preferably formed from wedge wire screen having bars arranged generally parallel to the water flow. The bars have spaces therebetween to allow water flow therethrough. Frame 30 has an upper end 44 positioned above water surface 22 where frame 30 is adjacent to dam 14. Frame 30 has a lower end 46 positioned below water surface 22. Bar screen panels 32 extend along frame 30 from a top end 52, which is preferably the point at or below where minimum pool elevation 22b intersects frame 30, to a bottom end 54 spaced a distance D above lower end 46 of frame 30. A flow scoop 34 is secured to frame 30 at lower end 46 and against bottom end 54. Flow scoop 34 extends downwardly from frame 30 and then outwardly in a more horizontal direction away from dam 14. A support system 36 braces frame 30 off of upstream face 20 of dam 14. Support system 36 can include one or more struts secured to frame 30 and extending to dam 14 to brace frame 30 at the desired angular orientation with respect to dam 14.

Flow scoop 34 has an upper portion 48 secured to frame 30 and extending along frame 30 for distance D. Flow scoop 34 has a lower portion 50 angled with respect to upper portion 48 and extending from upper portion 48 such that lower portion 50 is oriented in a generally horizontal direction. It is contemplated that the orientation of lower portion 50 can range from about horizontal to about 45 degrees below horizontal line H. Flow scoop 34 directs water flow upwardly in the direction of arrow B along the upper side of bar screen panels 32. The remaining water flow is directed in the direction of arrow T below frame 30. The water flow directed along arrow T is water flow that is diverted for other uses, such as to power a turbine or the like positioned downstream of water intake 16.

Flow scoop 34 is preferably a solid structure that is impervious so that all of the water flow on the upper side of flow scoop 34 is directed upwardly along bar screen panels 32. Flow scoop 34 creates turbulent upward flow and increased velocities so the fish will be directed along the upstream face of bar screen panels 32. Flow scoop 34 also acts as a barrier to discourage smolts or other fish from traveling down bar screen panels 32 and below frame 30. The turbulent flow at flow scoop 34 also discourages predators from positioning themselves at flow scoop 34 in order to capture fish traveling into diversion system 10.

Flow scoop 34 can be provided with a number of flow vanes 56 extending upwardly from flow scoop 34. Flow vanes 56 increase the turbulence of water flow on the upper side of flow scoop 34 to further assist in directing the fish to the upper side of bar screen panels 32. In another embodiment, it is contemplated that water lines could be provided with outlets positioned at flow scoop 34 to supply a supplemental water flow to increase the water flow along the upper side of flow scoop 34. Supplemental water flow may be necessary if flow at the dam is low.

The elevation of lower portion 50 below water surface 22 is preferably situated at or slightly below the elevation at which the fish approach the waterway structure. In one specific example, this elevation is about 10 meters below water surface 22. However, as discussed herein, this elevation may be adjusted based on conditions occurring at the dam.

Frame 30 is oriented at an angle A in the range of 0 degrees and 90 degrees with respect to horizontal line H. In one specific form it is contemplated that angle A is about 45 degrees, however, other orientations of frame 30 are also contemplated based on hydraulic conditions at dam 14. It is further contemplated that support system 36 could be provided with, for example, a hydraulic system and telescoping struts. This would allow the length of the struts to be increased or decreased to move lower end 46 away from or towards dam 14, changing angle A and thus the orientation of frame 30 in response to the hydraulic conditions at the dam and/or the elevation of the fish in the water column.

Bar screen panels 32 have an upper end 52 that preferably terminates at or below the location where minimum pool elevation 22b intersects frame 30. A fish diverter device 38 is secured to frame 30 and/or at or adjacent to the upper end 52 of bar screen panels 32. Fish diverter device 38 includes an incline panel 40 coupled at one end to frame 30 and/or the upper end 52 of bar screen panels 32. Fish diverter device 38 further includes a channel 42 having an entry portion 41 coupled to the other end of incline panel 40 opposite upper end 52 of bar screen panels 32. Preferably, incline panel 40 is pivotally connected to frame 30 and/or upper end 52, and is also pivotally coupled to entry portion 41. This pivotal connection allows the fish diverter device 38 to rise and fall in concert with the elevation of water surface 22 between minimum pool elevation 22b and maximum pool elevation 22a.

In another embodiment, incline panel 40 is fixedly connected to frame 30 and/or upper end 52, and is also fixedly coupled to entry portion 41. In this embodiment, upper end 44 of frame 30 is movable along dam 14 in response to the water elevation, and incline panel 40 maintains a constant orientation with respect to frame 30. Frame 30 can also be pivotally attached to support system 36, and the orientation of frame 30 can be adjusted as necessary with support system 36 to accommodate movement of frame 30 and to adjust the orientation of frame 30 with respect to horizontal line H.

As the fish swim upwardly along bar screen panels 32, the bar screen panels 32 provide a gradual incline or bottom for the fish to orient towards at they follow upward flow along bar screen panels 32 towards diverter device 38. Bar screen panels 32 are configured to provide a relatively low flow velocity and pressure normal to the bar screen panels 32. Bar screen panels 32 pass water through the openings in the wedge wire screens as the water flows upwardly towards upper end 52. This contributes a dewatering effect that reduces flow velocities along the upper face of bar screen panels 32 as the water travels towards upper end 52. The dewatering effect provided by bar screen panels 32 reduces impinging pressures that can harm the fish as they travel along bar screen panels 32 to diverter device 38. It is contemplated that the spacing between the individual bars of bar screen panels 32 can be varied along frame 30 based on the hydraulic conditions at the dam in order to provide the desired reduction in flow velocity therealong. Of course, the maximum spacing would be limited such that the fish could not get caught between or pass between the bars.

When the fish reach the top of bar screen panels 32, the incline panel 40 directs the fish into entry portion 41. By the time the water flow reaches incline panel 40, the flow velocities are very low in order to provide a gradual transition for the fish into entry portion 41. Incline panel 40 can include a number of openings 58 formed therethrough to further contribute to the dewatering effect and reduce the flow of velocities therealong to gently direct the fish into entry portion 41 and into collection channel 42. Collection channel 42 can be a conduit or channel that transports the fish to a collection facility or passes them around the dam structure or through some other acceptable route around dam 14. Collection channel 42 could also be used to control the head in system 10. It is further contemplated that an enumeration system could be integrated with the incline panel 40/entry portion 41 to estimate the number of smolts or fish passing into collection channel 42. PIT tag readers and/or optical and acoustical imaging systems could also be installed at this point in the system 10.

Diversion system 10 may be employed across a portion or the entire width of the structure in the waterway. For example, if dam 14 is a powerhouse, the entire portion of the powerhouse where the turbines are located could be provided with multiple diversion systems 10. It is further contemplated the multiple diversion systems could be spaced from one another and selectively employed at turbine unit intake locations. It is further contemplated that the fish can be channeled towards the diversion system 10 using the known behavior guidance structures. Since all the components of diversion system 10 are removable, maintenance to diversion system 10 is simplified. The diversion system 10 can be seasonally removed, such as between fish runs, for cleaning and maintenance. A cleaning trolley could also be used to brush and rake debris from the face of bar screen panels 32 should it accumulate over a period of time.

Bar screen panels 32 could also be removably deployed along frame 30 to further enhance maintenance. For example, bar screen panels 32 could be provided with rollers that are guided in tracks on frame 30. This would allow bar screen panels 32 to be quickly removed for cleaning and replaced when fish migration is in season.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fish diversion system for diverting fish around a structure extending below the surface of a body of water, the fish diversion system comprising:
   a frame extending between an upper end oriented towards the water surface and a lower end oriented below the water surface, said lower end being positioned more upstream than said upper end;
   a number of bar screen panels supported by said frame below the water surface, said bar screen panels allowing water flow therethrough from an upstream side to a downstream side;
   a flow scoop extending upstream from said lower end of said frame; and
   a fish diverter device adjacent said upper end of said frame in communication with said upstream side of said bar screen panels.

2. The system of claim 1, wherein said flow scoop includes an upper side and an opposite lower side, said upper side including a number of flow vanes extending therefrom.

3. The system of claim 1, wherein said bar screen panels are removably mounted to said frame.

4. The system of claim 1, wherein said frame and said bar screen panels are oriented about 45 degrees below horizontal.

5. The system of claim 4, further comprising a support system extending between said frame and the structure to maintain said frame at said orientation.

6. The system of claim 1, wherein said flow scoop has an upper portion and a lower portion, said upper portion extending along said frame for a distance and said lower portion being angled with respect to said upper portion so that said lower portion extends in a generally horizontal direction.

7. The system of claim 6, wherein said flow scoop is impervious.

8. The system of claim 1, wherein said fish diverter device includes:
   an incline panel pivotally attached at one end to the upper end of at least one of said frame and said bar screen panels;
   an entry portion to a collection channel pivotally attached at the other end of said incline panel.

9. The system of claim 8, wherein said incline panel has a number of openings formed therethrough.

10. A fish diversion system for diverting fish around a structure extending below the surface of a body of water, the fish diversion system comprising:

a frame extending between an upper end oriented towards the water surface and a lower end oriented below the water surface, said lower end being positioned more upstream than said upper end;

a number of bar screen panels supported by said frame below the water surface, said bar screen panels allowing water flow therethrough from an upstream side to a downstream side;

a fish diverter device adjacent said upper end of said frame and in communication with said upstream side of said bar screen panels, said fish diverter device including:

an incline panel pivotally attached at one end to said upper end of at least one of said frame and said bar screen panels; and an entry portion to a collection channel pivotally attached at the other end of said incline panel.

11. The system of claim 10, wherein said incline panel has a number of openings formed therethrough.

12. The system of claim 10, further comprising a flow scoop extending from said lower end of said frame.

13. The system of claim 12, wherein said flow scoop has an upper portion and a lower portion, said upper portion extending along said frame for a distance and said lower portion being angled with respect to said upper portion and extending therefrom in a generally horizontal direction.

14. The system of claim 10, wherein the structure is a dam.

15. The system of claim 10, wherein said bar screen panels include wedge wire bars.

16. A method for diverting fish around a structure extending below the surface of a body of water, the method comprising:

providing a frame having an upper end and a lower end, the lower end positioned below the water surface;

providing a number of bar screen panels on the frame below the water surface, the bar screen panels allowing water flow therethrough from an upstream side to a downstream side of the bar screen panels;

sloping the bar screen panels and the frame so that the lower end is positioned upstream relative to the upper end; and providing a flow scoop at the lower end of the frame and the bar screen panels to direct water flow and fish in an upward direction along the upstream side of the bar screen panels.

17. The method of claim 16, further comprising diverting the fish around the structure at the upper end of the frame.

18. The method of claim 16, further comprising reducing the water flow along the bar screen panels as the water moves toward the upper end of the frame and bar screen panels.

19. The method of claim 16, wherein the flow scoop has a first portion extending along the frame and a second portion extending from the first portion, the second portion angled with respect to said first portion and extending in a generally horizontal direction.

* * * * *